July 16, 1957  P. W. BULLOCK  2,799,581
METHOD FOR MATCHING OPPOSING DENSITIES IN PHOTOGRAPHIC FILM
Filed July 21, 1952
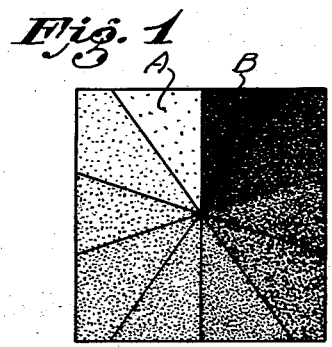
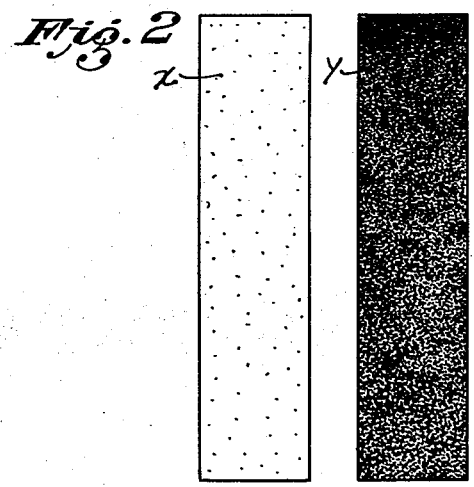
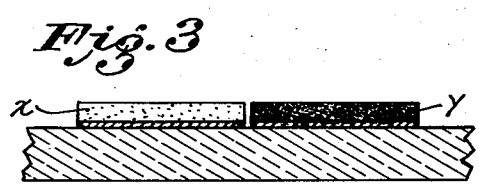
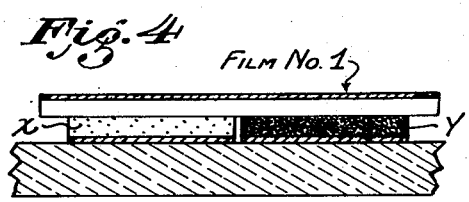
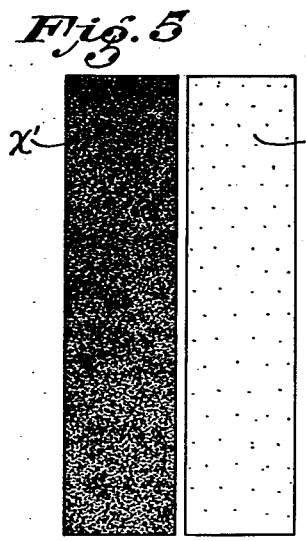
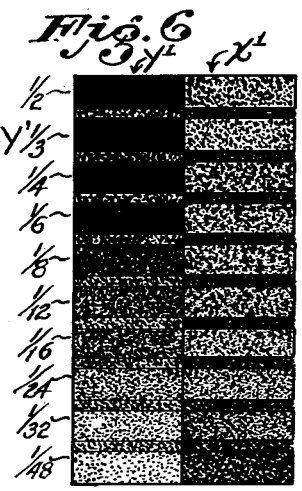
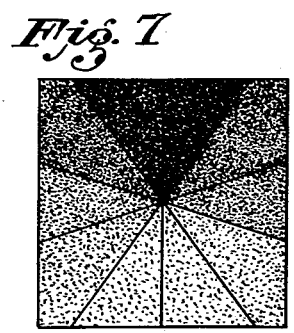
INVENTOR,
PERCY WYNNE BULLOCK
BY
ATTORNEY.

United States Patent Office 2,799,581
Patented July 16, 1957

2,799,581

METHOD FOR MATCHING OPPOSING DENSITIES IN PHOTOGRAPHIC FILM

Percy Wynne Bullock, Monterey, Calif.

Application July 21, 1952, Serial No. 300,106

1 Claim. (Cl. 96—27)

The present invention has for an object the reducing of time and materials for any required matching or density control of opposing densities in motion picture continuous film, whether in black and white or color, and for still photography.

In my United States Letters Patent No. 2,438,494, I have described a system of partial reversal line control which includes as a basic step the matching or approximate matching of opposing densities of an original negative. In partial reversal line or partial reversal continuous tone photography, there is required two exposures and two development steps. These steps require critical control for the matching of or density control of any two opposing densities. These opposing densities may be photographed on film, either from an original subject, or copied from a film onto another film. The present invention is not limited to any partial reversal process, as the invention may be employed for matching opposing density areas of any photographic image record. The invention may be utilized in any photographic printing process employing image masks.

At the present time, the matching of two opposing contrasting densities is accomplished by trial and error methods. In the case of motion picture film, and particularly colored motion picture film, the trial and error method of matching opposing densities is not practical and a further object of the present invention is the matching of two opposing contrasting densities in a positive manner, which greatly reduces trial and error, and wherein the results are always predictable and certain.

In the drawing, I have illustrated various steps which may be employed in the practice of the process of the invention, and wherein:

Figure 1 is representative of ten opposing densities of an original negative,

Figure 2 is representative of two density film strips,

Figure 3 is an end elevation showing the film strips of Figure 2 placed with the emulsion side up on the glass of a printing frame, Figure 4 is a view similar to that of Figure 3 of an unexposed film placed emulsion side down on the film strips, Figure 5 is a positive film image illustrating the result of printing the unexposed film shown in Figure 4, Figure 6 shows the result of the second exposure of the film of Figure 5 through a ten-step density scale, the spaces between the numbered steps representing transparent areas in the step wedge, and, Figure 7 shows the final processing step wherein the densities are matched.

In the carrying out of my invention, I provide what is known as a graduated density film step set made of sensitive film, transparent plastic, or any material that may be substituted for any desired densities in place of photo material. The size of each strip need not be exact, but should be of the general shape of whatever type of step wedge is used. I have found it expedient to have the density strips equal to one-half the width of the step wedges. Thus, if the step wedge is two inches wide, the film strips should be one inch wide and the length of each strip should be at least equal to the combined widths of the density steps which make up the step wedge. I have used a step wedge of 5 inch measurement, and hence the film strips are 5 inches long.

The film strips are used to match or nearly match any desired density areas of an original black and white or color film, or positive or negative copy therefrom. They are used to match such densities whenever such density areas are the size, shape or placement on a film as to make their use with a step wedge impractical or impossible. To accomplish this purpose, I have found it expedient to have sets of density film strips. The number of density strips determining the matching possibilities of the set. Hence, I have found it expedient to increase rather than decrease the number of strips to a set, and a set containing 30 strips is recommended. It is essential, of course, that each strip should have an even all-over density, and accordingly the first film strip may have a density of .10, each succeeding film strip increasing in density by .10 in arithmetical progression. Thus, when 30 strips are used, the said strips would cover a density range of .10 to 3.0, and have a matching possibility within .05 of any density found in the film having a density range of .10 to 3.0 or less. It has been found that a greater number of strips is required to a set for use in color photography, where the density ranges may be from .10 to 4.0, or higher. Two of the density film strips are shown in Figure 2, the white strip being .05 density, while the dark strip is representative of any density between .05 and 4.0.

To illustrate use of the process and means, I will follow through the steps, commencing with Figure 1, which has densities A and B representing two opposing densities of the original negative, the densities of which are to be matched. To do this, I use the film strips heretofore described, and which film strips have a graduated density. For the present, these film strips are shown in Figure 2, and these film strips have, by visual observation or through use of a densitometer, the same densities as the densities shown at A and B in Figure 1, which is to say .05 and 4.0. The film strips have been substituted for the reason that the two opposing densities, as shown in Figure 1, are not of a size, shape or location on the film to permit their use with the step wedge. The two film strips shown in Figure 2, and which I have marked X and Y are placed side by side, emulsion side up, on the glass of the printing frame, as illustrated in Figure 3. All of the dark room lights, with the exception of the safe light recommended for the particular film, are now turned off and a piece of commercial film, such as Eastman Kodak Commercial Film, which I herein call film No. 1, is then placed with its emulsion side in contact with the two film strips, as shown in Figure 4. It is to be noted that I am considering at the present time, use of film suitable for reproducing continuous black and white values. However, for line or color work, any film so designated by its manufacturer for line or color photography, may be used. The unexposed film shown in Figure 4 is then given a first exposure through film strips X and Y, and this exposure is made in accordance with the manufacturer's recommendations. After this film, which I have designated as film No. 1, has been given its first exposure, and first development, the development being in accordance with the manufacturer's recommendation, the film records a positive or complementary image of densities X and Y. The higher density of film strip Y becomes the lower density, which I designate at $Y^1$, and the lower density of the film strip X becomes the higher density $X^1$, the area or space between $X^1$ and $Y^1$ of Figures 5 and 6 being representative of the transparent areas in the step wedge.

In the case of partial reversal, at the end of first development, the film is immediately taken from the developer and placed with its emulsion side up toward a light bulb whose light is to be used for a second exposure. The film at this point has a positive image of the two film strips, and a step wedge, with its emulsion side down, is placed in contact with the film. Exposure is then made while the film is in contact with the step wedge, thus permitting the second exposure to be made through the step wedge. The film is then returned to the developer for a second development, which constitutes a partial reversal second development, and the second development is continued for approximately three-quarters of the time used for the first development. There is no rigid rule for the time of the second development, as it is not a critical factor. The times of both the first and second developments depend on the partial reversal results desired. After removing the film from the developer, at the termination of the second development, the film is placed in an acetic acid stop bath for 15 seconds, and then fixed in the conventional manner. Film No. 1, when viewed against a light, appears as illustrated in Figure 6, wherein it will be noted that the opposing densities $X^1$ and $Y^1$ of film No. 1 have now been matched in density on step one-twenty-fourth of the illustration.

For the partial reversal density and contrast relationship of the two opposing densities found on any step of the step wedge now appearing on film No. 1 that it is desired to duplicate on another film of the same type, to be similarly processed, but without the use of the step wedge, and called film No. 2, the procedure is as follows viz: From the same original negative that film No. 1 is reproduced from, film No. 2 is given the same processing for the first exposure, first development, and second development of the partial reversal process as was given for film No. 1. This is true for the reason that it will be remembered that with film No. 1, the two film strips X and Y were superimposed over film No. 1 for the first exposure. The equivalence of density between A and B of the original negative and X and Y of the two film strips makes the interchange possible. The desired second exposure for film No. 2 is based upon the second exposure time give film No. 1, the fraction number recorded on film No. 1, the step whose contrasting densities it is desired to duplicate on film No. 2. These fraction numbers recorded on film No. 1 relate to the relative density of each step of the step wedge. The light intensity of the second exposure given film No. 1 is noted. Therefore, if we take the three factors, to wit, the second exposure time given film No. 1, multiplied by the fraction number recorded on film No. 1, multiplied by the light intensity, the three factors will equal the time of the second exposure for film No. 2. Thus, by way of example, if the second exposure time given film No. 1 is 8 seconds, and the fraction number of the particular step of the step wedge is one-eighth, then it is evident that film No. 2 without the step wedge, would receive the same time exposure as film No. 1 with the step wedge, for the reason that film No. 1, when exposed through the step of the step wedge, marked one-eighth, required 8 times the exposure which is required to give an equal exposure on the same type of film not exposed through the step wedge. This is explained by the fact that the density of step one-eighth is 8 times that of zero density, zero density being the exposure without the step wedge. The light intensity is measured from the light as given for film No. 1 and herein assumed to be from a 20-watt bulb at 20 inches from the film. Hence, multiplying these factors, we find that the second exposure for film No. 2 is one second, utilizing a 20-watt bulb 20 inches from film No. 2.

Film No. 2, after the final processing step, as outlined above, has the densities A and B matched or nearly matched, as illustrated in Figure 7.

A graduated density film strip set such as described is designed primarily to make possible the use of step wedges with the advantage step wedges may offer in determining a desired second exposure in partial reversal photography. This advantage obviously is that a film given a second exposure without the use of a step wedge is exposed only once, and that a film exposed through a step wedge is given as many exposures as there are density steps in the step wedge. If the step wedge has 15 different density steps, a film exposed through it has 15 different exposures from which the photographer may choose any one for the exposure he desires.

The graduated density film strip sets and their use applies with equal force to black and white and color still photography, and to black and white and color motion picture photography. The same process is followed, whether it be black and white or color as just described, and the principle of use of the graduated density film strip sets remain the same. It is evident that the trial and error method of matching opposing densities, either for color photography, or for black and white, is not resorted to, but in its place, I have presented a process and means wherein any result desired may be obtained with guesswork reduced to a minimum.

I claim:

The method of matching opposing density areas of a photographic image record, which consists in providing a series of film strips, each strip representative of a given density, and each strip having an even all-over density, choosing from the original photographic image negative two opposing contrasting densities, selecting two of said film strips whose densities match these two opposing contrasting densities of the said photographic image negative, placing the two density film strips so selected in a printing frame in side by side relationship, placing the emulsion side of an undeveloped first film in contact with the two density film strips, exposing the first film through the said two density film strips, and developing said first film, providing a step wedge having different density fractional index sections to pass a given fraction of the total light projected therethrough, placing the step wedge with its emulsion side to the emulsion side of said first film so that the images of the density film strips thereon are in contact with all of the steps of the step wedge, then exposing this unfixed and developed film, immediately after being taken from the developer through the step wedge to light for its second exposure, thereafter returning the film to the developer for a second development; fixing the film and examining it again to ascertain on which step of the step wedge the two opposing densities of the film strips are matched, thereafter matching the two opposing densities of the said first film on a second film having the same characteristics as the first film without the use of the step wedge by placing the said original photographic image negative, emulsion side up, in a printing frame, putting the said second film, emulsion side down, in contact with the said original photographic image negative, and exposing to light through said original negative and then developing said second film in a developer of the same characteristics as the developer for said first film, then exposing said second film to a uniform light source of an exposure value reduced in relation to the exposure value of the second exposure of the first film by the amount of the fractional index number printed on the step of the step wedge at which the opposing densities of the first film were matched, then fixing and drying said second film on which the two opposing densities of the first film are now matched.

References Cited in the file of this patent

UNITED STATES PATENTS

| Number | Name | Date |
| --- | --- | --- |
| 1,460,703 | Capstaff | July 3, 1923 |
| 2,226,167 | Gillon | Dec. 24, 1940 |
| 2,438,494 | Bullock | Mar. 30, 1948 |